United States Patent
Linhart et al.

(10) Patent No.: US 8,518,143 B2
(45) Date of Patent: Aug. 27, 2013

(54) METHOD FOR PRODUCING A CERAMIC FILTER ELEMENT AND FILTER ELEMENT

(75) Inventors: Jochen Linhart, Schwaikheim (DE); Sabine Otterbach, Bietigheim-Bissingen (DE); Kathrin Lichtenwalter, Gerlingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 11 days.

(21) Appl. No.: 13/206,922

(22) Filed: Aug. 10, 2011

(65) Prior Publication Data

US 2011/0312492 A1    Dec. 22, 2011

Related U.S. Application Data

(63) Continuation of application No. PCT/EP2010/051616, filed on Feb. 10, 2010, and a continuation-in-part of application No. 13/033,979, filed on Feb. 24, 2011, which is a continuation-in-part of application No. 11/651,544, filed on Jan. 10, 2007, now Pat. No. 7,913,377, which is a continuation of application No. PCT/EP2005/052884, filed on Jun. 21, 2005, said application No. 13/033,979 is a continuation-in-part of application No. 11/945,371, filed on Nov. 27, 2007, now abandoned.

(30) Foreign Application Priority Data

Jul. 10, 2004  (DE) .......................... 10 2004 033 494
Feb. 10, 2009  (DE) .......................... 10 2009 008 299

(51) Int. Cl.
*B01D 39/14*  (2006.01)
*B01D 39/06*  (2006.01)
*B01D 24/00*  (2006.01)
*B01D 50/00*  (2006.01)
*F01N 3/00*  (2006.01)
*B01J 23/10*  (2006.01)
*B01J 23/32*  (2006.01)
*F01N 3/10*  (2006.01)
*F01N 3/08*  (2006.01)
*F02P 15/00*  (2006.01)

(52) U.S. Cl.
USPC ................. 55/523; 55/522; 55/524; 422/172; 422/173; 422/174; 422/175; 422/176; 422/177; 422/178; 422/179; 422/180; 60/297; 502/303; 123/156

(58) Field of Classification Search
USPC ............. 55/522–524; 422/169–182; 60/297; 502/303; 123/156
See application file for complete search history.

(56) References Cited

U.S. PATENT DOCUMENTS

| 4,528,008 A | * | 7/1985 | Takagi et al. ................... 55/485 |
| 5,820,646 A | * | 10/1998 | Gillingham et al. ............ 55/488 |

(Continued)

FOREIGN PATENT DOCUMENTS

DE      102007011569   *  9/2008

*Primary Examiner* — Amber Orlando
(74) *Attorney, Agent, or Firm* — James Hasselbeck

(57) ABSTRACT

The invention relates to a method for producing a ceramic filter element in an exhaust gas filter for an internal combustion engine, in particular a diesel particulate filter, wherein a base paper carrier web is soaked with a ceramic slip and then burnt out. The base paper carrier web uses a thickness and/or structure that varies over the width and/or length of the base paper carrier web.

6 Claims, 1 Drawing Sheet

(56) References Cited

U.S. PATENT DOCUMENTS

| | | | |
|---|---|---|---|
| 5,888,262 A * | 3/1999 | Kahler | 55/497 |
| 6,534,021 B1 * | 3/2003 | Maus | 422/180 |
| 6,673,414 B2 * | 1/2004 | Ketcham et al. | 428/116 |
| 6,764,743 B2 * | 7/2004 | Kato et al. | 428/118 |
| 7,468,166 B2 * | 12/2008 | Gaiser | 422/180 |
| 2003/0072694 A1 * | 4/2003 | Hodgson et al. | 422/180 |
| 2004/0177600 A1 * | 9/2004 | Ichikawa et al. | 55/523 |
| 2004/0208803 A1 * | 10/2004 | Bruck | 422/180 |
| 2007/0186911 A1 * | 8/2007 | Gerlach et al. | 123/556 |
| 2010/0129271 A1 * | 5/2010 | Micke et al. | 422/180 |
| 2011/0107732 A1 * | 5/2011 | Schildermans et al. | 55/482.1 |

* cited by examiner

METHOD FOR PRODUCING A CERAMIC FILTER ELEMENT AND FILTER ELEMENT

CROSS REFERENCE TO RELATED APPLICATIONS

This application is a bypass continuation application of international application No. PCT/EP2010/051616 filed Feb. 10, 2010 designating the United States of America, the entire disclosure of which is incorporated herein by reference. Priority is claimed based on German patent application no. 10 2009 008 299.9, filed Feb. 10, 2009.

The present application is a continuation in part (CIP) of and claims priority to currently pending U.S. patent application Ser. No. 13/033,979 filed Feb. 24, 2011, the entire contents of U.S. patent application Ser. No. 13/033,979 incorporated herein by reference. U.S. patent application Ser. No. 13/033,979 is a continuation in part (CIP) of U.S. patent application Ser. No. 11/651,544 (now U.S. Pat. No. 7,913,377) which is a continuation of international patent application no. PCT/EP2005/052884, filed Jun. 21, 2005, designating the United States of America, and published in German on Jan. 19, 2006 as WO 2006/005668 which claims priority from German patent application no. 102004033494.3, filed Jul. 10, 2004. U.S. patent application Ser. No. 13/033,979 is a continuation in part of U.S. patent application Ser. No. 11/945,371 filed Nov. 27, 2007 which claims priority from Federal Republic of Germany patent application no. 102006056196.1, filed Nov. 27, 2006.

TECHNICAL FIELD

The invention relates to a method for producing a ceramic filter element in an exhaust gas filter of an internal combustion engine. In particular, the invention concerns a ceramic diesel particulate filter.

BACKGROUND OF THE INVENTION

In patent Abstracts of Japan JP 63134020 A, a ceramic filter element for an exhaust gas filter in an internal combustion engine is disclosed that is constructed of a corrugated spirally wound filter web. For producing the filter web, heat-resistant inorganic fibers are mixed in aqueous suspension with ceramic powder and processed to a web. Several stacked webs are rolled to the desired shape of the filter body whereby between neighboring filter webs honeycomb-shaped flow passages are formed. The filter body is subsequently fired at high temperature.

WO 2006/005668 discloses a method for producing a ceramic filter element in an exhaust gas filter for internal combustion engines. In this connection, first a combustible non-ceramic support web is impregnated with a ceramic slip and, subsequently, burned out in the desired geometric shape until the support web is combusted and a rigid filter body is generated.

In this method, the wall thickness of the finished ceramic substantially corresponds to the thickness of the support web. Likewise, by means of the structure of the base paper, the porosity of the ceramic is influenced.

A disadvantage of the disclosed method is that no filter elements with variable wall thickness, porosity and cell density can be produced.

SUMMARY OF THE INVENTION

The invention concerns in particular the production of ceramic filter elements as diesel particulate filters and particulate filters for internal combustion engines as well as ceramic supports for catalyst supports.

In the method that is preferred in the invention a non-ceramic medium, for example, paper, in particular paper comprising cellulose, is first shaped, for example, to the shape of a coil body. The coil body can comprise a flat layer and a corrugated layer. This shape, for example, the coil body, is then impregnated with a ceramic material, for example, a ceramic slip. The impregnated shape is then fired or sintered. In this connection, organic components, for example, of the paper that comprises e.g. cellulose fibers, can be removed or converted.

It is the object of the present invention to provide a method for producing a ceramic filter element, in particular of a diesel particulate filter, in an exhaust gas filter of an internal combustion engine, which method makes it possible to realize in the filter element a variable wall thickness, porosity, and cell density. Accordingly, the ceramic filter element becomes more flexible and better adaptable to application purposes and conditions of use.

These and other objects are solved by the method for producing a ceramic filter element according to claims presented herein and the ceramic filter element according to claims.

The invention provides a method for producing a ceramic filter element for an exhaust gas filter for internal combustion engines, in particular for diesel particulate filters, and/or as a catalyst support. In the method, a base paper support web is impregnated with a ceramic slip and subsequently burned out. The employed base paper support web can have across its width and/or length a different thickness and/or structure.

The invention makes available a ceramic filter element for exhaust gas filters in internal combustion engines, in particular diesel particulate filters, and/or as catalyst supports that has across its length and/or its diameter a different thickness and/or structure.

In the winding direction and/or perpendicular to the winding direction, for example, thickness, porosity, pore distribution, fiber diameter distribution, fiber diameter average, fiber mixing ratio, for example, synthetic fiber with cellulose, and/or weight per surface unit of one or several layers of the base paper support web, for example, of a flat layer and a corrugated layer that may be connected to a semi-finished product, can be varied.

The winding direction in the finished filter element corresponds to the radial direction. Perpendicular to the winding direction corresponds in the finished filter element to the longitudinal axis from the inlet side to the outlet side.

The paper thickness varies preferably between 0.2 and 0.5 mm, the porosity preferably between 50 and 100, the pore distribution can be preferably between 10 μm and 100 μm. Fiber diameters or their average are preferably above 500 μm. The weight per surface unit varies preferably in the range of 40 g/m2 to 150 g/m2.

The base paper support web, wherein paper in this invention may mean different paper-like media, in particular non-ceramic, can increase or decrease in thickness, for example, in the winding direction in one of several base paper support web layers, for example, in a flat layer and/or a corrugated layer. In this way, a filter element with varied thickness of the filtration layer can be produced. By impregnation of the base paper support web with the ceramic slip and sintering, the thickness of the base paper support web is transferred to a corresponding thickness of the layer in the ceramic When the thickness increases, the filter element in the radial outer area would have thicker walls than in the radial inner area.

As an alternative or in combination, the thickness of the paper can also increase or decrease perpendicularly to the winding direction. In this way, a filter element can then be produced that, for example, at the inlet side has thicker walls than at the outlet side.

Like the thickness of the base paper support web, the structural properties are also carried over to the properties of the ceramic body.

Up to now, no DPFs with different wall thicknesses and/or porosities within one component are known. Standard diesel particulate filters of ceramic are extruded as a one-part or multi-part object. Based on the principle, the extrusion process cannot generate variable wall thickness and/or porosity across the length of the component.

According to the invention, a special base paper is now produced that already during the paper manufacturing process is embodied to have across the width or across the length a different thickness and/or structure or openness (open pores). After impregnation with ceramic slip these different thicknesses and/or porosities are also reproduced in the ceramic filter element. This is individually possible for the corrugated layer as well as for the cover layer and allows for a multitude of variations.

Across the width of the web this is as possible in a simple way during the paper-making process. Across the length of the paper web, this can be controlled with much more difficulty during the paper-making process. Therefore, an alternative embodiment resides in that papers of different thickness and/or porosity are joined with each other, for example, by gluing, embossing, fusing, sewing and the like. This could be done before producing the semi-finished product or, alternatively, differently designed semi-finished products could be joined with each other before the winding process.

A further embodiment in connection with using several semi-finished products proposes that, in addition, different cell sizes and cell shapes can be combined in a component across the diameter.

As already mentioned, the wall thickness and/or the porosity is varied either across the length of the component or across the diameter. Also, a combination of both is possible.

The solution according to the invention has the following advantages:
- optimization of pressure loss
- optimization of mechanical strength
- adaptation of the geometry to inflow at the filter in the exhaust gas manifold in order to generate a more uniform soot and ash loading
- adaptation in accordance with the catalytic coating; the catalytic coating is applied primarily in certain partial areas.

The coatings have a strong effect on pressure loss and temperature distribution in the component. By means of the adapted wall thickness or porosity in accordance with the invention, the component can be optimized with regard to the coating.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
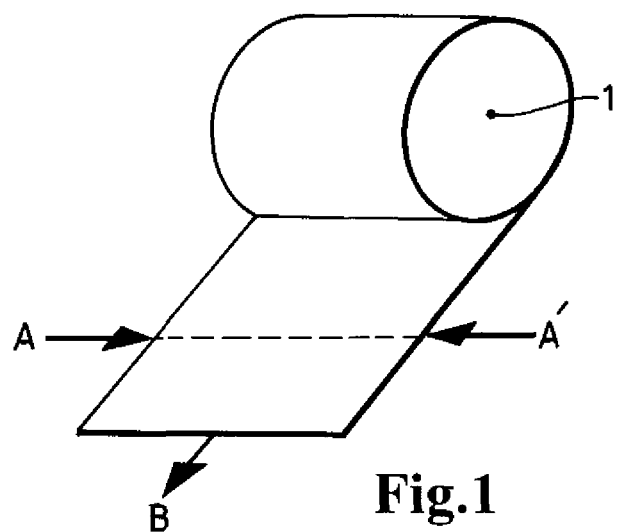
FIG. 1 depicts winding of one or several base paper support web layers, for example, of a semi-finished product of flat layer and corrugated layer, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components and method steps related to a method for producing a ceramic filter element as well as the ceramic filter element. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 labels and defines in which directions variations of thickness and structure of base paper support web layers are possible. In particular, for a semi-finished product comprised of corrugated layer and flat layer to be wound, the corrugated layer and/or the flat layer can be varied with regard to thickness and structure. A-A' defines the direction perpendicular to the winding direction. B indicates the winding direction. The longitudinal axis of the filter element is indicated by (1).

Figure 2A:
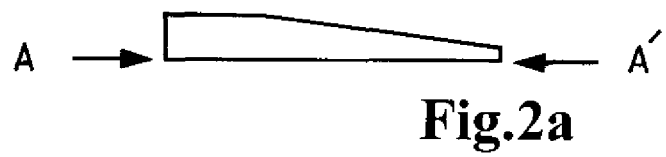
FIGS. 2a, 2b and 2c each generally illustrate different profile variations of the thickness of a base paper support web layer, consistent with the present invention.
Figure 2B:
Figure 2C:
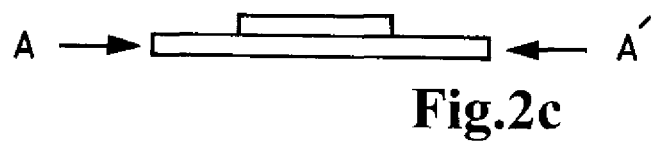

FIG. 2 shows in which way the thickness of a base paper support web and correspondingly the ceramic wall after sintering can be varied in the longitudinal direction of the filter element. A corresponding variation is also possible in direction B. In FIG. 2c the realization of the thickness change, for example, by two layers of a paper, is indicated.

Figure 3:
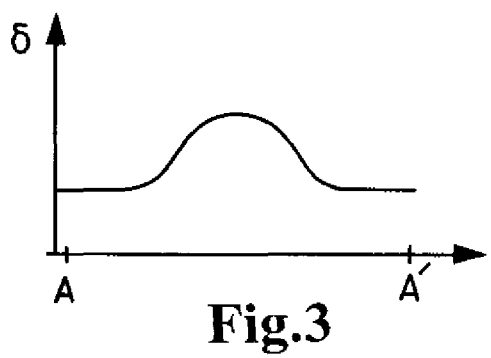
FIG. 3 illustrates the general variation of the surface area density of a base paper support web layer, consistent with the present invention.

FIG. 3 shows the variation of a structural parameter of a base paper support web that is transferred correspondingly onto the ceramic A variation of the surface density is illustrated, for example.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims.

The invention is defined solely by the appended claims including any amendments made during the pendency of this application and all equivalents of those claims as issued.

The invention claimed is:

1. A method for producing a ceramic diesel particulate filter element for diesel exhaust gases and/or ceramic catalyst support element filter element for internal combustion engines, comprising:
    forming at least one layer of at least one base paper support web in which at least one of the at least one support web is formed to have a varying thickness across a width and/or length of the support web;
    impregnating said at least one paper support web with a ceramic slip, wherein the ceramic slip takes the shape of the support web; and subsequently
    sintering the at least one impregnated support web layer, burning out said paper by combustion, leaving at last one rigid ceramic layer in the shape of the at least one paper support web layer,
    wherein the varying thickness of the at least one base paper support web layer is carried over to a corresponding thickness of the resulting at least one ceramic layer.

2. The method according to claim 1, wherein
    in the forming step, the at least one support web is formed to have a varying structure across a width and/or length of the support web;
    wherein in the forming step, the varying structure across the width and/or the length is any of: a different porosity, pore distribution, fiber diameter distribution, fiber diameter average, fiber mixing ratio, and/or weight per surface unit of one or several layers of base paper support webs.

3. The method according to claim 2, wherein
    the paper thickness varies and/or is between 0.2 and 0.5 mm, the porosity varies and/or is between 50 and 100, the pore distribution varies and/or is between 10 mm and 100 mm, the fiber diameter or the fiber diameter average varies and/or is above 500 mm, and/or the weight per surface unit varies and/or is in the range of 40 g/m2 to 150 g/m2.

4. The method according to claim 2, wherein
    the varying structure and/or the varying thickness of the at least one paper support web varies in the winding direction.

5. The method according to claim 2, wherein
    the varying structure and/or the varying thickness of the at least one paper support web varies perpendicularly to the winding direction.

6. The method according to claim 1, wherein before the impregnating step the method further comprises
    winding said at least one layer of said at least one base paper support web about an axis to form a coiled paper support web body.

* * * * *